Figure 1:
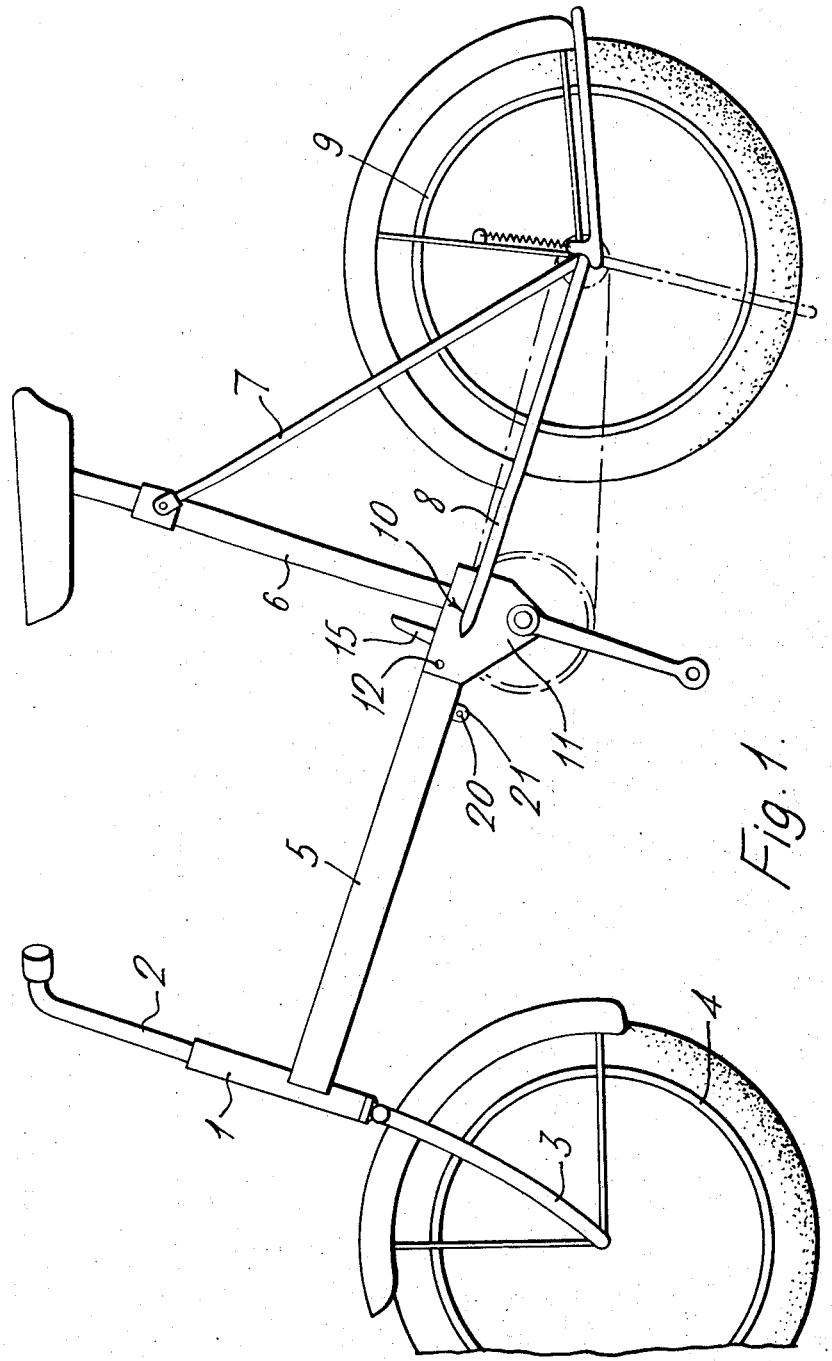

Jan. 9, 1968   J. R. V. DOLPHIN   3,362,725
FOLDING CYCLE FRAMES

Filed May 5, 1965   3 Sheets-Sheet 3

United States Patent Office 3,362,725
Patented Jan. 9, 1968

3,362,725
FOLDING CYCLE FRAMES
John R. V. Dolphin, The Mill, Whitchurch,
Oxfordshire, England
Filed May 5, 1965, Ser. No. 453,438
Claims priority, application Great Britain, May 5, 1964,
18,600/64
7 Claims. (Cl. 280—287)

This invention relates to improvements in folding frames for cycles, such as bicycles, motor cycles and motor scooters, and concerns an improved form of latch for securing the parts of the frame in a predetermined relationship to one another.

There have been various proposals for constructing folding cycle frames, in which the frame comprises two parts hinged together and provided with means for locking the frame in the erected condition. For example there have been proposals for folding the frame about a horizontal transverse axis, which may be offset so that, in the folded condition, the front and rear wheels of the cycle come alongside each other. In other proposals the frame folds about a vertical axis, which is offset slightly to one side of the central vertical plane of the frame, and one or more pivoted or sliding spring-loaded latches, provided with a manual release lever, hold the frame in the erected condition. However these known constructions have suffered from drawbacks of difficulty of operation, cost, and liability to unexpected failure and for this reason there is not, at present, available on the market any folding cycle frame that is cheap, simple to erect and free from failures. Constructions are known in which, in the erected condition, the frame is held together by bolts but these require the use of spanners to release the joint and are not practical for everyday use.

It is an aim of the present invention to provide a new and simple form of locking hinge on a cycle frame, reliable in operation and simple to use. According to the invention a forward frame portion carrying the steering head and a rear frame portion carrying the back wheel and saddle are hinged together about an axis which extends transversely with respect to a horizontal line in the plane of the frame, and latching means are provided not only for locking the frame in the erected condition but also for locking the two frame portions with respect to each other in the folded condition.

This is particularly useful where the cycle is to be carried in its folded condition, for example where it is to be put in the boot of a car. When locked in the folded condition the frame forms a rigid structure that cannot change its form and cannot inadvertently regain the erected condition, as could happen with known folding cycle frames.

Preferably, according to a further feature of the invention, the same latch member is used for locking the frame both in the erected and in the folded condition. This keeps down the number of parts and simplifies operation.

The axis about which the frame folds could be vertical or horizontal or at any intermediate angle. Where it is vertical, the front of the frame will swing round until the front and back wheels come side by side. Where it is horizontal it need not be truly perpendicular to the longitudinal centre line of the frame but could be skewed so that in the folded condition of the cycle the front and rear wheels lie in different planes and can therefore overlap.

Figure 2:
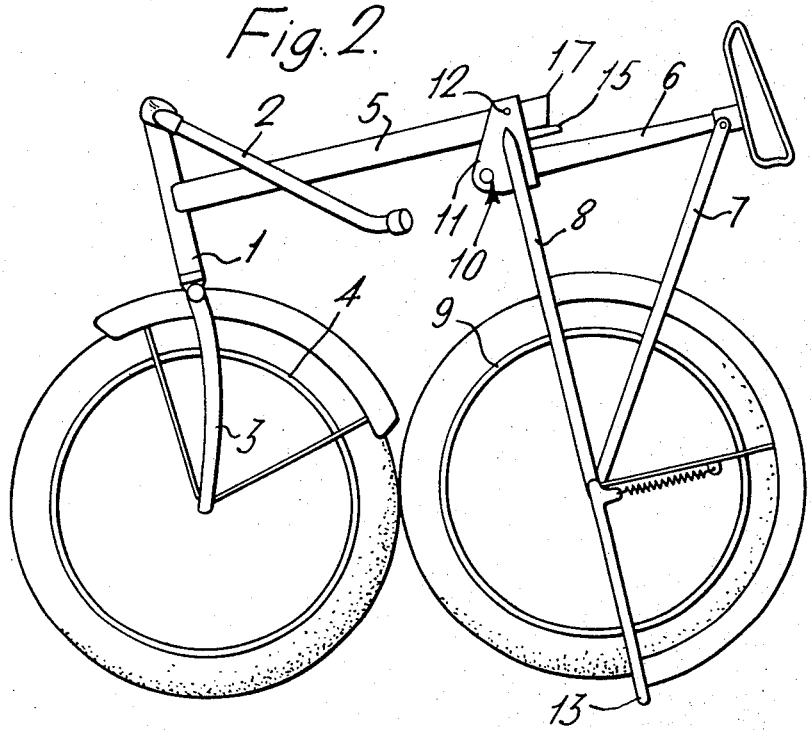
Figure 3:
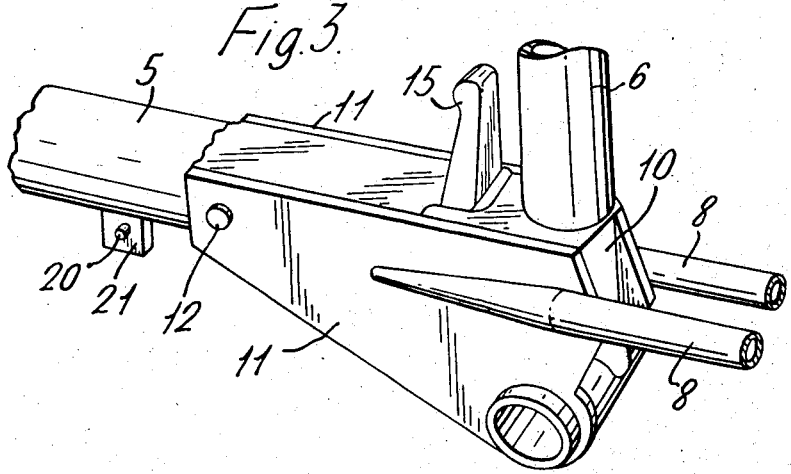

An example of a pedal bicycle having a folding frame constructed in accordance with the invention will now be described by way of example with reference to the accompanying drawings, in which:

FIGURE 1 shows the bicycle in the erected condition;
FIGURE 2 shows the bicycle in the folded condition;
FIGURE 3 is a perspective view of the region of the hinge in the frame of the bicycle; and
FIGURE 4 is a side elevation of the region of the hinge, showing hidden parts in broken line.

Referring first of FIGURES 1 and 2 the front portion of the bicycle frame comprises a steering head tube 1 with handlebars 2 and front forks 3 carrying a front wheel 4, and a front down tube 5. The rear portion of the frame comprises a seat tube 6, seat stays 7 and chain stays 8, carrying a back wheel 9. The bottom bracket 10 carries a pair of side plates 11, spaced apart and lying in vertical planes. Between their forward ends these plates carry a horizontal pivot pin 12 which passes through the rear end of the down tube 5 and forms a pivotal connection between the front and rear portion of the frame.

FIGURE 2 shows the relative positions occupied by the two portions of the frame in the folded condition. It will be noted that the handlebars fold down to reduce the height of the folded structure and furthermore that a swinging rear stand 13, even in its normally non-operative position relative to the rear portion of the frame, enables the folded structure to stand upright.

Figure 4:
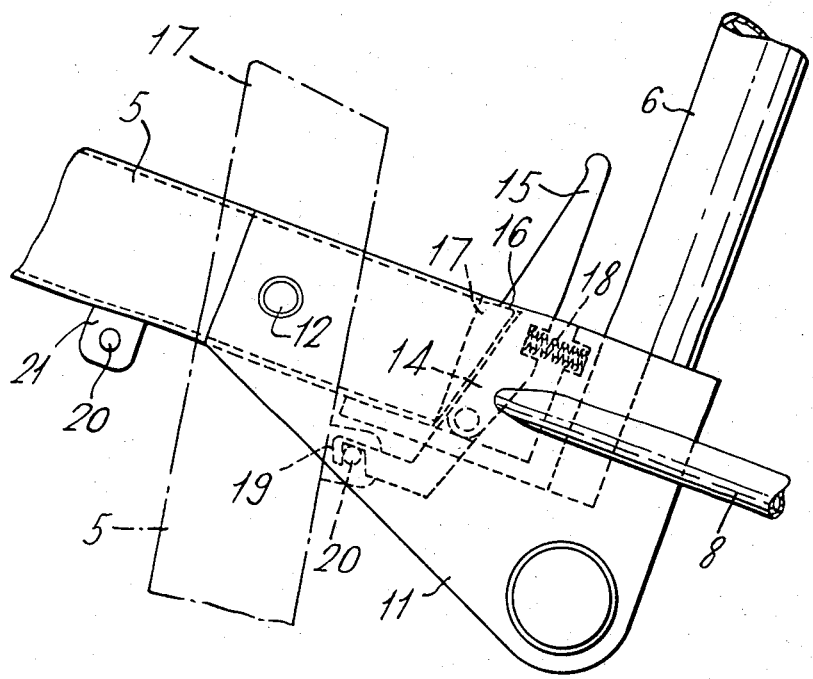

Referring now to FIGURES 3 and 4, a latch member 14 is pivotally mounted in an opening in the bottom bracket 10 between the plates 11 and has an upwardly extending manually operable lever portion 15. A latching face 16 engages a corresponding face on the end of an insert 17 carried in the end of the down tube 5. A spring 18 (FIGURE 4) urges the member 14 in such a direction as to keep these faces in contact, and the face 16 is not made tangential to a circle centered on the pivotal axis of the member 14 but is inclined so that, even if the face of the insert 17 wears after long use, a firm and rattle-free engagement is still obtained. Moreover it will be observed that the end of the insert 17 is wiped by edge of the face 16 as the frame is brought into the erected position, giving the latch a self-cleaning action and making it insensitive to dirt.

The lower end of the latch member 14 extends forward and carries a hook 19 which, in the fully folded condition of the frame, snaps over a pin 20 on a lug 21 carried underneath the down tube 5. In the erected condition the hook is shielded by the side plates 11.

To release the frame, either from its erected condition or from its folded condition, the user simply presses the lever 15 to the rear to disengage the latch member 14, whereupon the frame portions can be pivoted with respect to each other until they snap automatically into the folded condition or the erected position, as the case may be.

An important advantage of the placing of the hinge near the bottom bracket with its axis horizontal is that the bicycle can be folded without being lifted from the ground. The wheels roll and support the weight of the bicycle the whole time as it is being folded from the position shown in FIGURE 1 to that shown in FIGURE 2. Furthermore the mechanism "fails safe," that is to say, even damage to the latch member will not endanger the rider as, when the bicycle is being used, the weight of the rider keeps it in the erected condition.

The hinge and latch assembly are simple in construction, require no tools in operation and are inherently safe; furthermore they are readily applicable to existing designs of bicycle with the minimum of modification.

I claim:

1. A folding cycle frame comprising a forward frame portion, a rear frame portion, hinge means interconnecting said frame portions and defining a pivot axis inclined of the plane of the frame, said frame portions being relatively movable between an erected condition and a folded condition, a manually actuable latching lever pivoted on one of said frame portions, a first detent surface mounted on the other of said frame portions, said first detent surface co-operating with said latching lever in the erected condition of said frame portions, and a second detent surface on the other of said frame portions, said second detent surface co-operating with said latching lever in the folded condition of said frame portions.

2. A folding cycle frame as set forth in claim 1, wherein said forward frame portion comprises a down-tube having a rear end and said rear frame portion has a bottom bracket and wherein said hinge means interconnect said bottom bracket and said down-tube rear end.

3. A folding cycle frame as set forth in claim 2 wherein said latching lever is pivoted in said bottom bracket.

4. A folding cycle frame as set forth in claim 3 wherein said latching lever has a manual lever portion, said manual lever portion extending upwards from said bottom bracket.

5. A folding cycle frame comprising a forward frame portion lying substantially in one plane, a rear frame portion lying substantially in said plane, said frame portions being hingedly connected together about an axis perpendicular to said plane and being relatively movable about said axis between an erected condition and a folded condition, a latching lever pivotally mounted on one of said frame portions, and pivotal in the plane of such portion, said lever being disposed transversely of that part of the frame portion to which it is secured, and a latching surface on the other of said frame portions, said latching surface co-operating with said latching lever in the erected condition of said frame portions to lock said portions together in that condition.

6. A folding cycle frame as claimed in claim 5 wherein the said one frame portion presents an abutment into contact with which the other said frame portion moves on adjustment of the frame to its erect condition, and wherein the said latching lever is pivoted to hold the other said frame portion thereagainst.

7. A folding cycle frame comprising a forward frame portion lying substantially in one plane, a rear frame portion lying substantially in said plane, said frame portions being hingedly connected together about an axis perpendicular to said plane and being relatively movable about said axis between an erected condition and a folded condition, a manually disengageable spring-loaded latching lever pivotally mounted in one of said frame portions, a latching surface on the other of said frame portions, said latching surface co-operating with said latching lever in the erected condition of said frame portions to lock said portions together in that condition and a further latching surface on said other of said frame portions, said further latching surface co-operating with said latching lever in the folded condition of said frame portions to lock said portions together in that folded condition.

References Cited

UNITED STATES PATENTS

| 2,559,473 | 7/1951 | Slodek | 287—99 X |
| 2,771,145 | 11/1956 | Peters | 280—287 X |
| 2,777,711 | 1/1957 | Yokomaki | 280—287 |

FOREIGN PATENTS

| 604,113 | 6/1948 | Great Britain. |
| 495,992 | 7/1954 | Italy. |
| 177,930 | 1/1962 | Sweden. |

KENNETH H. BETTS, *Primary Examiner.*